July 21, 1970        H. E. W. MASCH        3,521,427

APPARATUS AND METHOD FOR ERECTING A CARRIER

Filed Aug. 30, 1967        15 Sheets-Sheet 1

INVENTOR.
HELMUT E.W. MASCH

BY
ATTORNEYS

INVENTOR.
HELMUT E.W. MASCH

BY Fryer, Tensvold,
Feix, Phillips & Lempio
ATTORNEYS

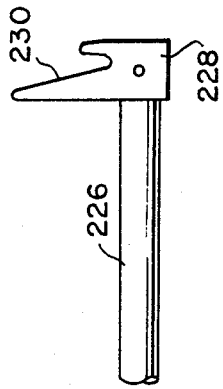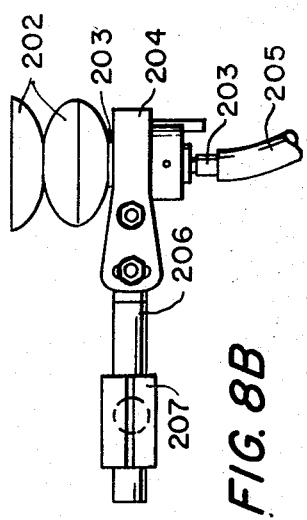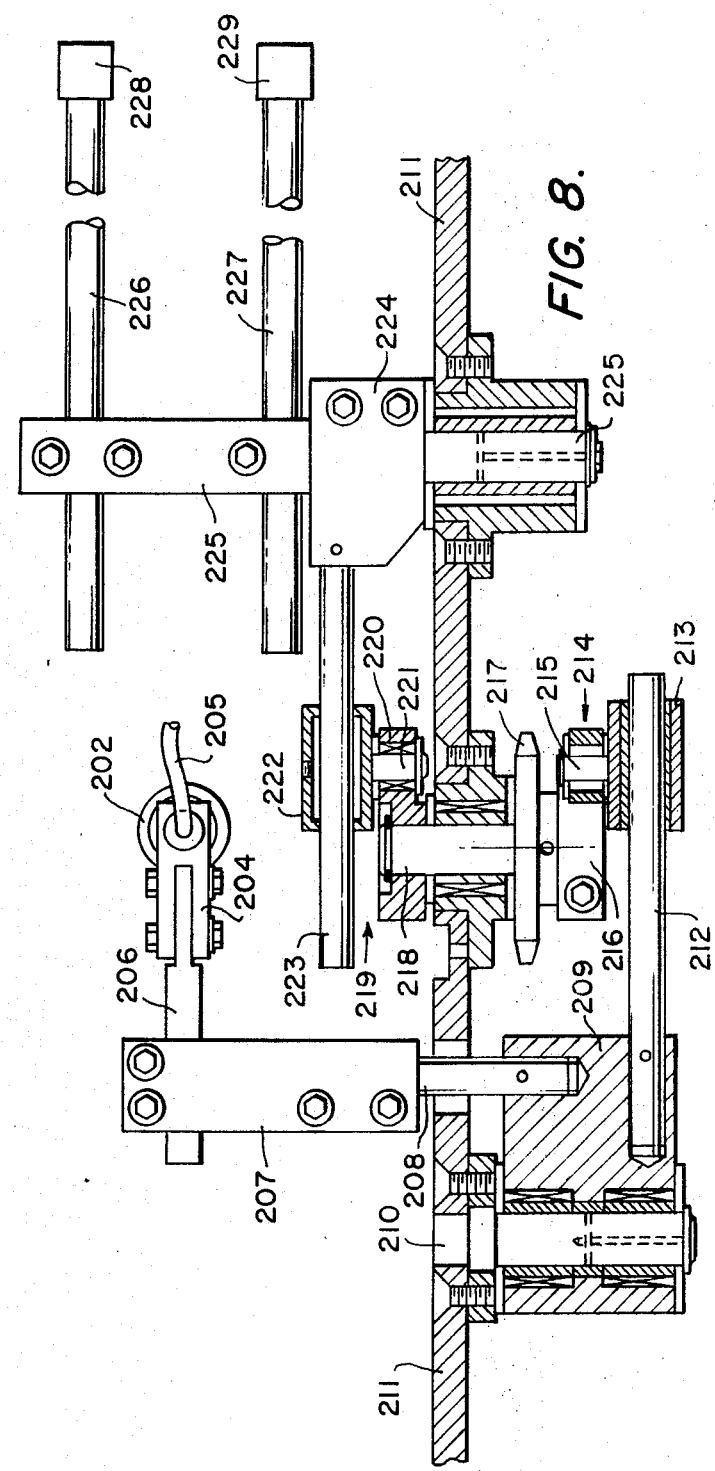

July 21, 1970  H. E. W. MASCH  3,521,427
APPARATUS AND METHOD FOR ERECTING A CARRIER
Filed Aug. 30, 1967  15 Sheets-Sheet 7

INVENTOR.
HELMUT E.W. MASCH
BY Fryer, Tjensvold,
Feix, Phillips & Lempio
ATTORNEYS July 21, 1970     H. E. W. MASCH     3,521,427
APPARATUS AND METHOD FOR ERECTING A CARRIER
Filed Aug. 30, 1967     15 Sheets-Sheet 10
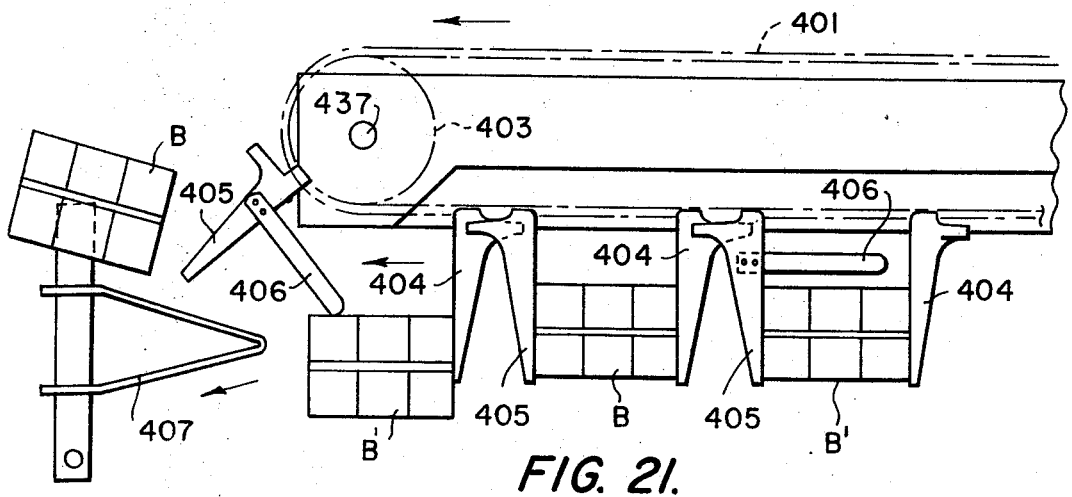
FIG. 21.
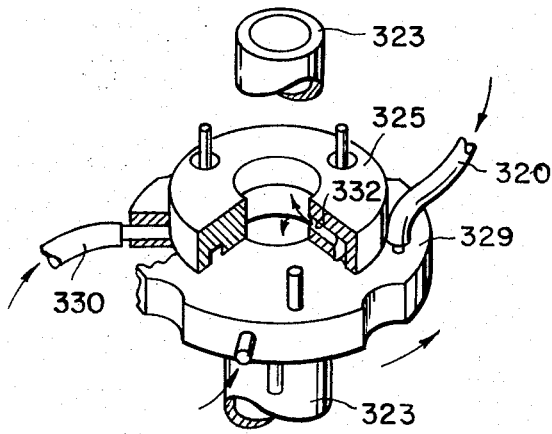
FIG. 14A.
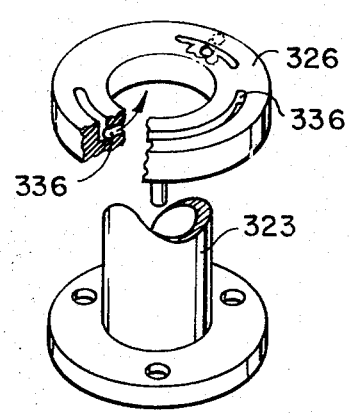
INVENTOR.
HELMUT E.W. MASCH
BY
ATTORNEYS INVENTOR.
HELMUT E.W. MASCH
BY Fryer, Tjensvold,
Feix, Phillips & Lempio
ATTORNEYS

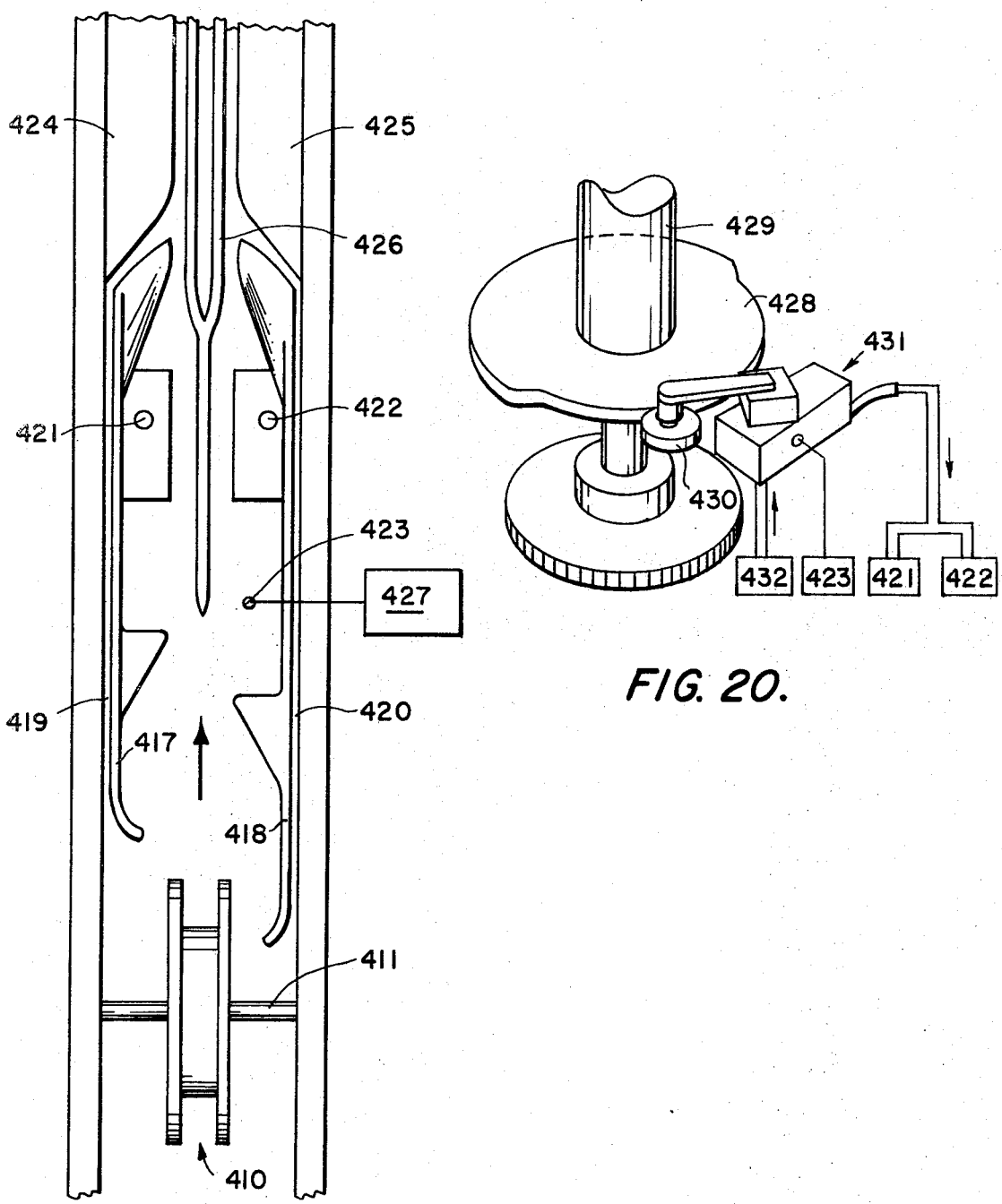

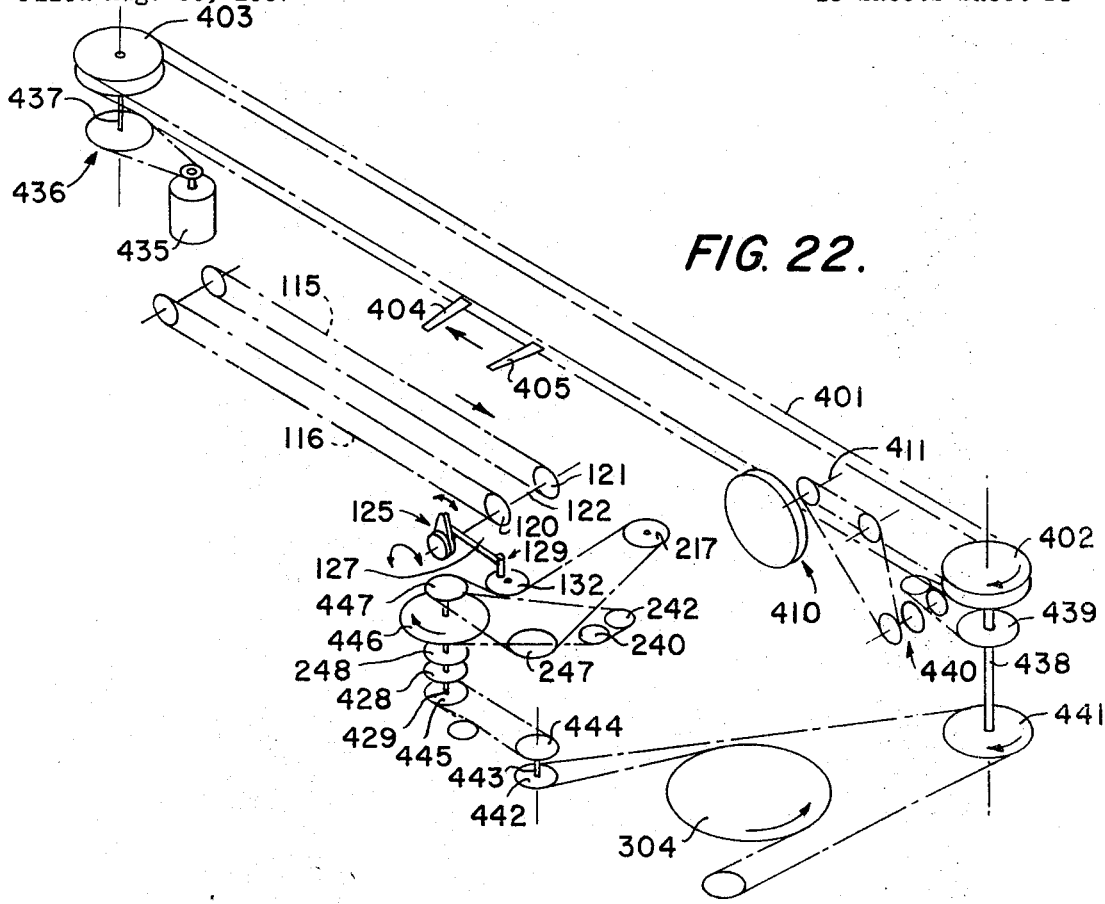

July 21, 1970   H. E. W. MASCH   3,521,427
APPARATUS AND METHOD FOR ERECTING A CARRIER
Filed Aug. 30, 1967   15 Sheets-Sheet 15
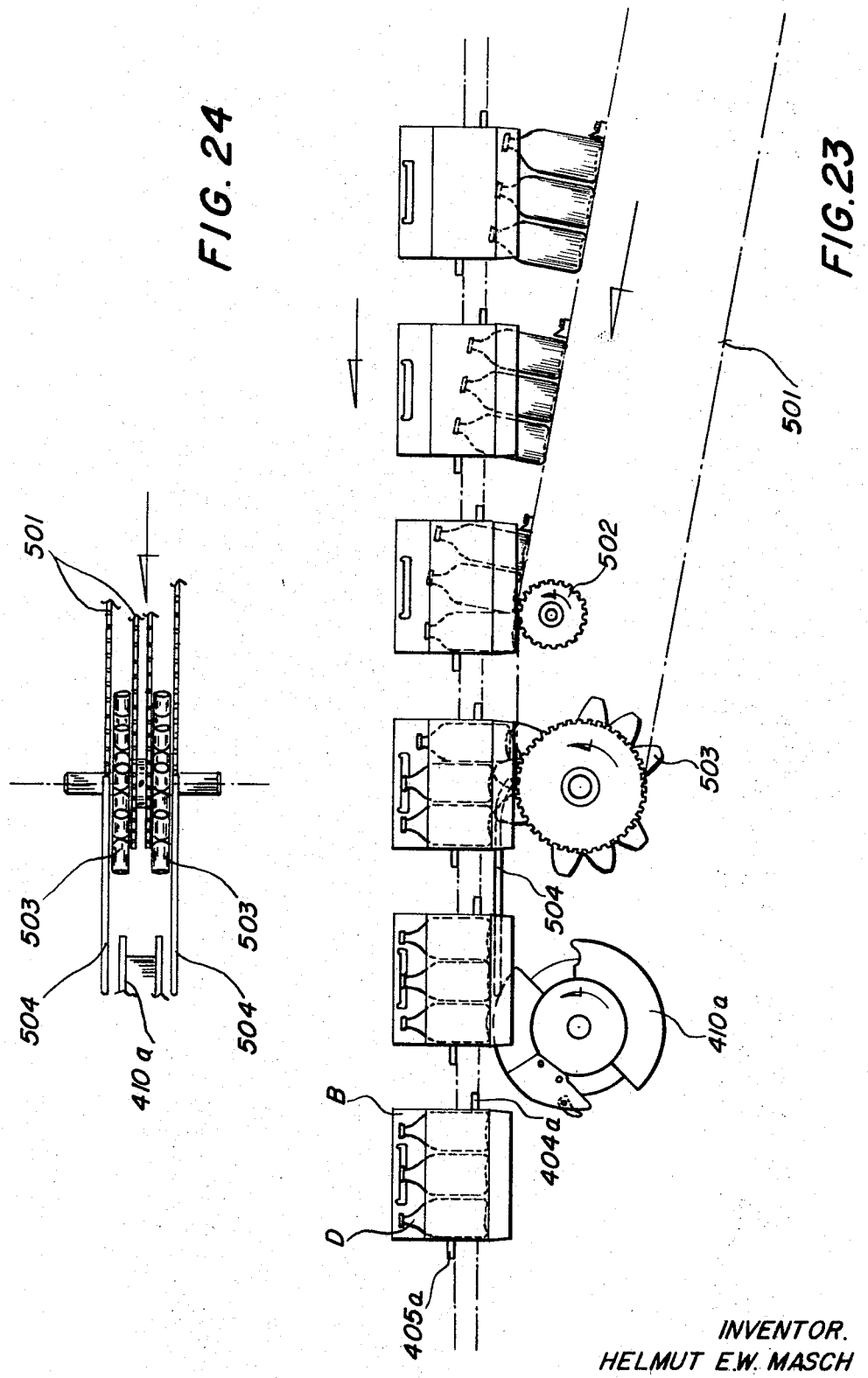
INVENTOR.
HELMUT E.W. MASCH
BY: Fryer Tensvold,
Feix, Phillips & Lempio
ATTORNEYS United States Patent Office 3,521,427
Patented July 21, 1970

3,521,427
APPARATUS AND METHOD FOR ERECTING A CARRIER
Helmut E. W. Masch, San Jose, Calif., assignor to Fibreboard Corporation, San Francisco, Calif., a corporation of Delaware
Filed Aug. 30, 1967, Ser. No. 664,390
Int. Cl. B65d 5/06
U.S. Cl. 53—186      38 Claims

ABSTRACT OF THE DISCLOSURE

Flattened, basket style carrier blanks are loaded into a carton magazine and conveyed toward an opening station comprising a rotary turret having a plurality of suction cups and attendant mechanisms mounted thereon. The turret functions to pick up and open each blank to a rectangular form and then transfer such partially erected carrier to a discharge conveyor. The conveyor moves the carrier through a folding and gluing station to fold and secure bottom closure flaps of the carrier together. Containers, such as bottles, may be inserted upwardly into the carrier prior to the formation of the carrier's bottom closure. A divider bar is arranged to cooperate with the conveyor to separate the erected carriers into two separate discharge lines.

---

Conventional basket style carrier blanks are generally stacked in a carton magazine and moved along a linear line of flight wherein flaps and panels of each blank are engaged by various mechanisms to erect the carrier for bottle or can retention purposes. Stationary plow means are usually employed to open the blank to a rectangular form. The carrier's bottom closure flaps are generally locked together mechanically by suitably arranged cut and tab means. Such conventional apparatus and methods are generally incapable of erecting more than eighty carriers per minute. Containers, such as bottles, are then dropped into suitably arranged pockets defined by divider panels of the carrier.

An object of this invention is to provide an apparatus and method whereby carriers can be errected efficiently at speeds approximating two hundred carriers per minute; a substantial increase over present-day speeds. In addition to such desiderata, further objects of this invention comprise: expeditious and efficient loading of flattened carrier blanks into a magazine; precisely controlled feeding of each blank from the magazine to an opening sttaion comprising a rotating turret; precise expansion of the blank to an open position by the turret which has suction cups and attendant opening mechanisms suitably mounted thereon; insertion of bottles or like containers upwardly into the partially formed carrier; a closely controlled and compact folding and secureance of the carrier's bottom closure flaps; and separating the completed carriers into two separate discharge lines.

Other and more specific objects of this invention will become apparent from the following description and accompanying drawings wherein:

FIG. 5a is a view similar to FIG. 5 with parts removed for clarification purposes, illustrating the manner in which a carrier blank is fed out of the feeding station;

FIG. 8 is an enlarged sectional view taken on line 8—8 in FIG. 5;

FIG. 8a is a fragmentary top plan view of a pusher employed in the feeding station;

FIG. 8b is a top plan view of a suction cup arrangement employed in the feeding station;

FIG. 14a is an exploded and partially sectioned view illustrating parts employed in the vacuum arrangement.

FIG. 19 is a top plan view of the folding and gluing station;

FIG. 20 is an enlarged, isometric view scematically illustrating a cam arrangement and control means for actuating a gluing means employed in the folding and gluing station;

FIG. 21 is an enlarged top plan view of a conveyor and discharged arrangement employed in FIG. 1 apparatus;

FIG. 22 is a view schematically illustrating the integrated drive train for the FIG. 1 apparatus;

Figure 1:
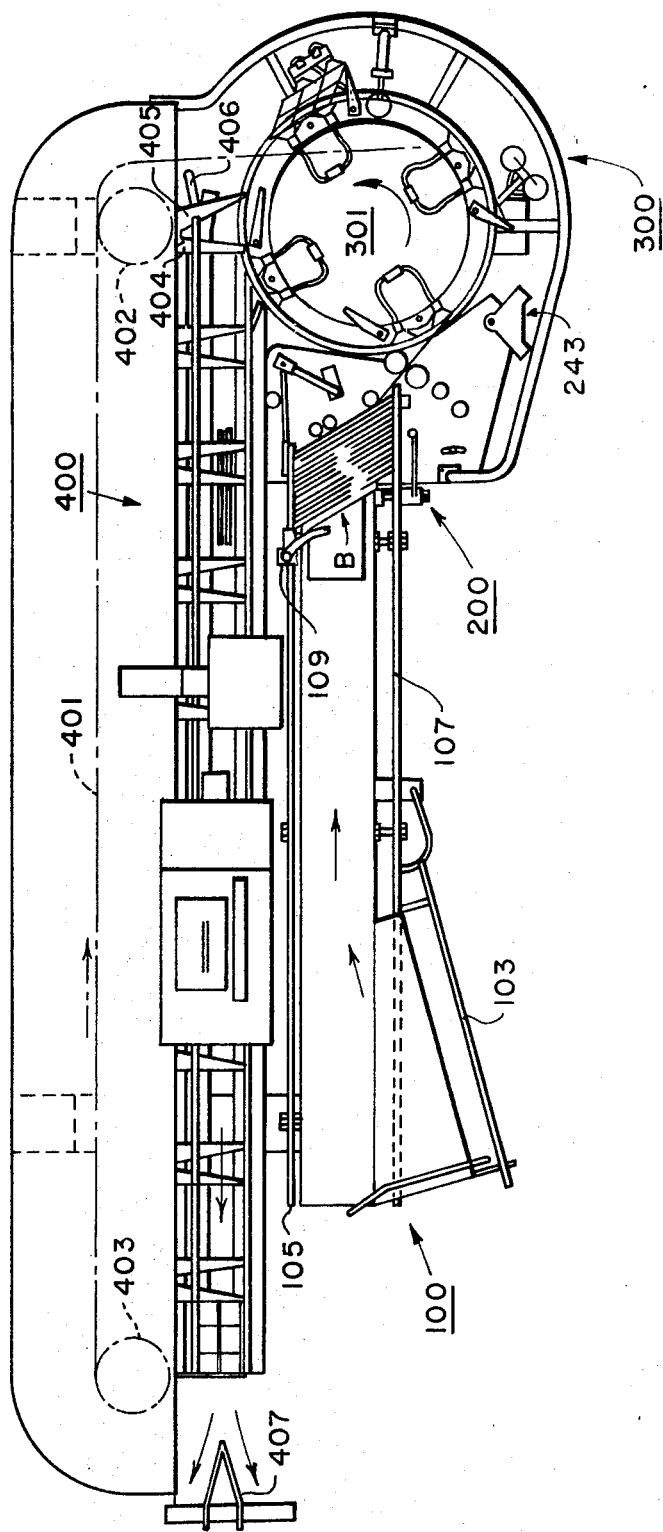
FIG. 1 is a top plan view of the preferred apparatus embodiment of this invention.

FIG. 23 schematically illustrates a modification of the FIG. 1 apparatus wherein a carrier filling station is added thereto; and FIG. 24 is a partial top plan view of the fiilling station.

BRIEF DESCRIPTION OF THE PREFERRED APPARATUS EMBODIMENT

FIG. 1 illustrates the general arrangement of the preferred apparatus embodiment of this invention. A stack of flattened carrier blanks B are loaded into the apparatus at a loading and magazine loading station 100 and conveyed along a first linear path to a feeding station 200. The blanks are fed individually into an opening station 300 whereat opposite side panels of the blank are moved apart to open the carrier into a rectangular form.

The partially erected carrier is then transferred to a conveyor which moves the carrier along a second linear path through a folding and gluing station 400 to fold and secure the bottom closure flaps thereof together. The completed carriers are then conveyed to the discharge end of the apparatus whereat the carriers are preferably divided into two separate lines for filling purposes. FIG. 23 illustrates a modification of this embodiment wherein containers, such as bottles, are inserted upwardly into the carrier at a filling station prior to formation of the carrier's bottom closure.

LOADING AND MAGAZINE STATION 100

Referring to FIGS. 1–4, carrier blanks B are preferably of the type disclosed in U.S. patent application Ser.

No. 551,263, now Pat. No. 3,411,663, by Norman H. More et al. for "Basket-Style Carrier and Method for Forming Same." The blanks may be loaded onto a horizontally disposed table 101 out of an inverted corrugated case C. The table forms an integral part of a stationary frame 102 of the apparatus. The case is then removed to permit the blanks to stand upright on the table.

A pushing means comprises a loading bar 103 mounted for vertical and pivotal movements on a stationary column 104. The bar may be lifted manually (or automatically via a suitably arranged hydraulic ram or the like) and pushed against the stacked carriers. The blanks are moved against a first stationary guide rail 105 spaced above and adjacent to the table. The left end of the bar is then locked behind a lug 106, affixed to table 101. Thus the bar may further function as an extension of a top rail 107 of second stationary guide rails 107 and 108, as indicated by dotted lines in FIG. 2.

Figure 4:
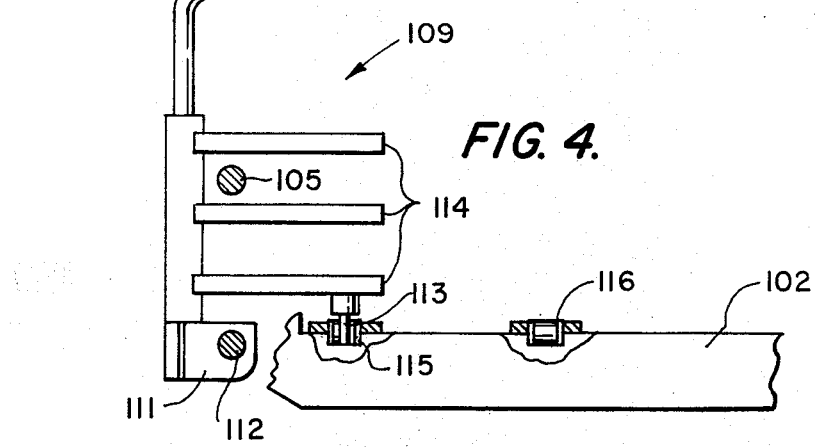
FIG. 4 is an enlarged sectional view taken on line 4—4 in FIG. 2.

A first conveying means is arranged between table 101 and guide rail 105 to move the blanks along a substantially linear path toward feeding station 200. Such conveying means comprises a pusher assembly 109 arranged to be grasped manually by a handle 110 thereof to move the assembly and position it behind the stacked carrier blanks. Referring to FIG. 4, the assembly comprises a bracket 111 slidably and rockably mounted on a stationary rail 112, arranged substantially parallel with respect to the blank's line of flight. A pin 113 is formed on the lower one of three arms 114 which form extensions of bracket 111.

The pin is arranged to engage a link of an endless conveyor chain 115 comprising a portion of the first conveying means. A second chain 116 is preferably arranged on the other side of this station. It should be noted that the pusher assembly could be attached to chain 115 by other means. For example, pin 113 could be spring-loaded and reciprocally mounted in lower arm 114. In such a modified arrangement bracket 111 would not require a rocking movement to reposition the assembly behind the stacked blanks.

Figure 2:
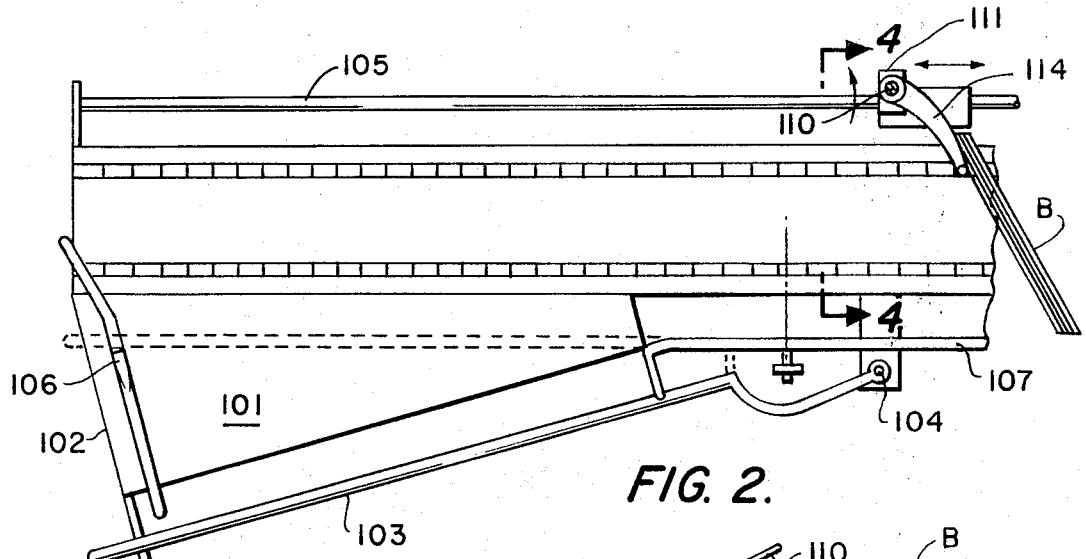
FIG. 2 is an enlarged, top plan view of a carrier blank loading station and magazine employed in the FIG. 1 apparatus.

Arms 114 are arranged to engage the back side of the stacked blanks nearest rail 105 to urge them toward station 200. Chains 115 and 116 create an additional conveying force due to the slight frictional engagement existing between the chains and the blanks. It should be noted in FIG. 2 that first guide rail 105 and second parallel guide rails 107 and 108 are preferably spaced closer together than the width of the carrier blank, i.e., the blanks are arranged at an oblique angle relative to the line of blank flight. Such an arrangement facilitates precise blank conveyance and feeding as will be hereinafter described. The angle may be selected from a range of from thirty degrees to eighty degrees and preferably approximately sixty degrees (FIG. 2).

FEEDING STATION 200

Figure 5:
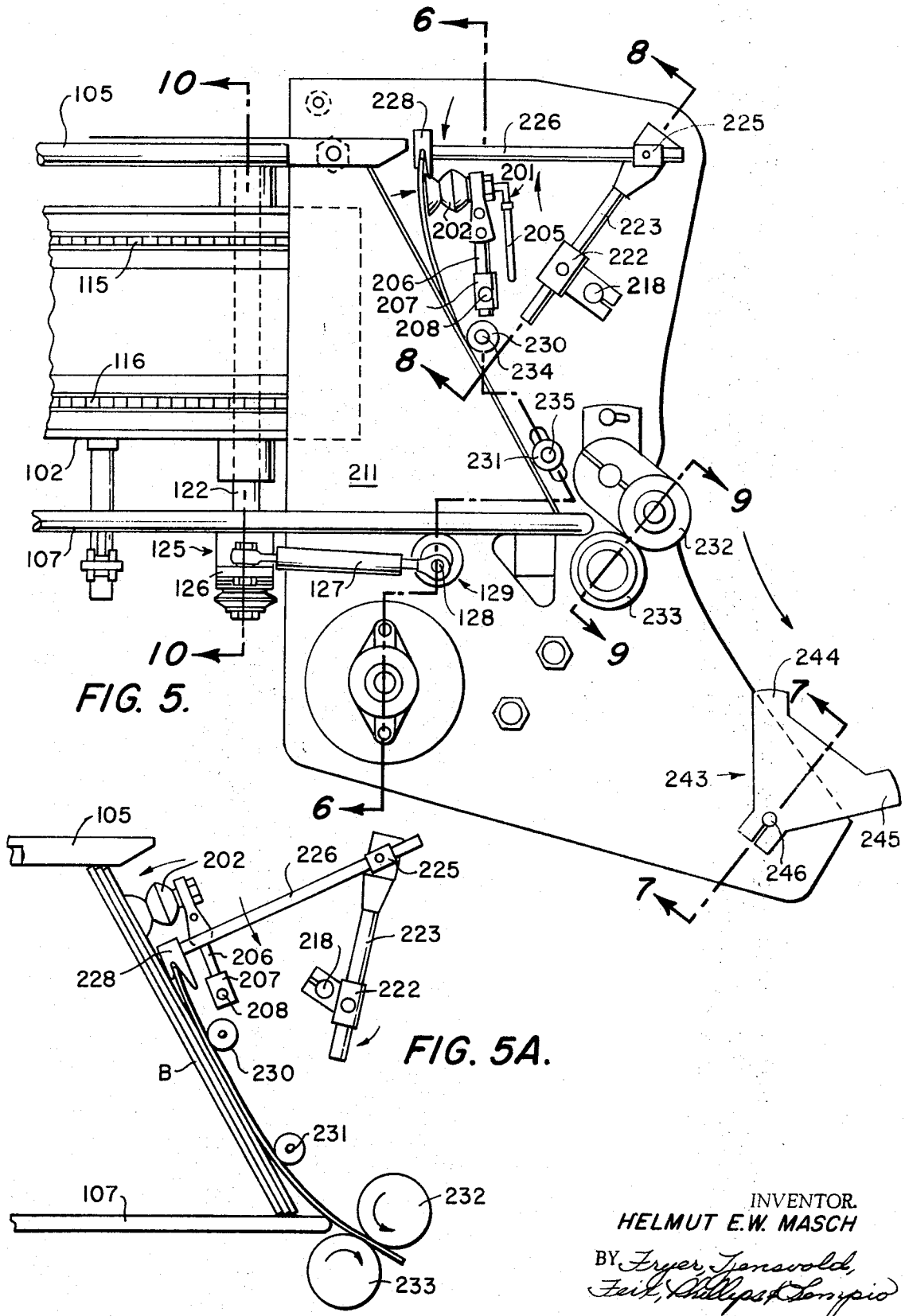
FIG. 5 is an enlarged, top plan view of a feeding station employed in the FIG. 1 apparatus.

Referring to FIGS. 5–10, feeding station 200 is arranged to remove a carton blank from station 100 and move it toward opening station 300. FIGS. 5 and 5a disclose the feeding station as it would appear during two progressive states of the feeding operation. In particular, a bending or first suction cup means 201 comprises a bellow-type rubber suction cup 202 arranged to grasp a trailing end of the blank and bend it to the FIG. 5 position, i.e. substantially in the direction of the blank's linear flight in station 100. Alternatively, the bending means could comprise a pivoted finger-like member arranged to hook onto and bend the blank.

Figure 6:
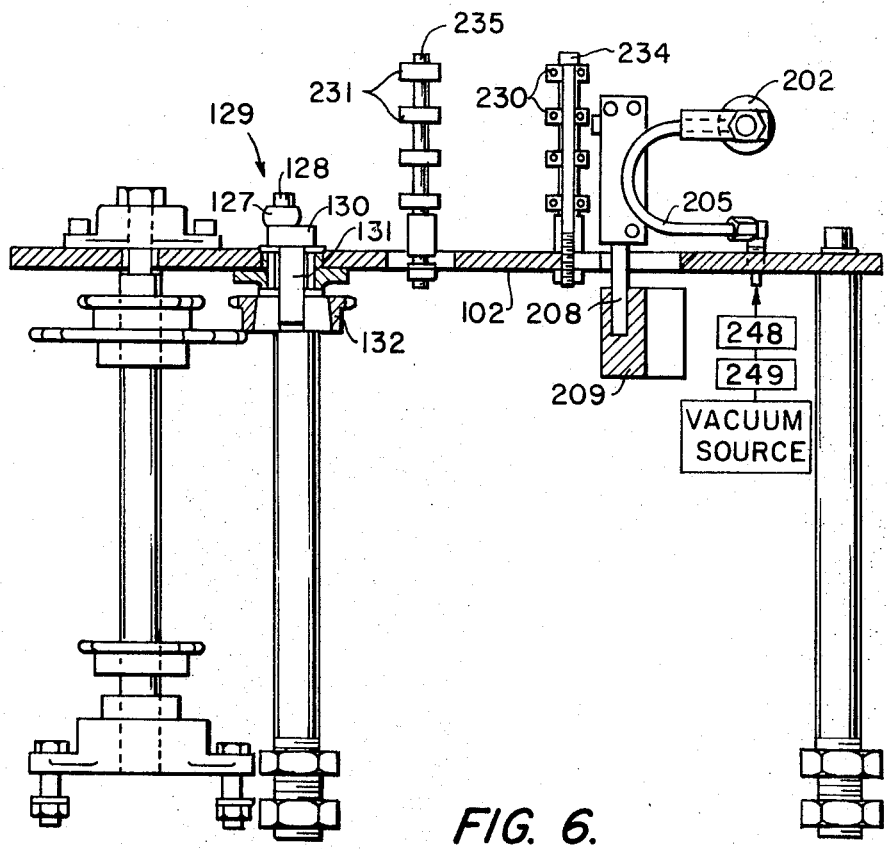
FIG. 6 is a sectional view taken on the line 6—6 in FIG. 5.
Figure 7:
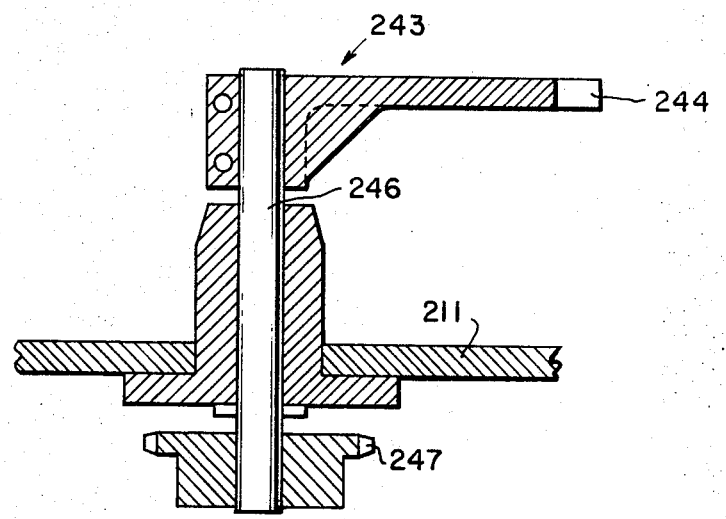
FIG. 7 is an enlarged sectional view taken on line 7—7 in FIG. 5.

The suction cup is mounted on a rigid conduit 203 attached to a bracket 204 (FIG. 8b). The other end of conduit 203 communicates with a flexible conduit 205 operatively associated with a selectively exposed vacuum or below ambient air source (FIG. 6). A cam means, hereinafter described, is arranged to alternately "pulsate" a vacuum or ambient air pressure to cup 202 to provide the proper timing for the blank pick-up function. A bifurcated end of bracket 204 is attached to a rod 206 which is in turn clamped to a bracket 207 (FIG. 8).

Bracket 207 is further clamped to a vertically disposed rod 208, secured to a bellcrank 209. The bracket is journalled by suitable bearing means on a stub shaft 210, secured to a stationary table 211 of frame 102. Arm 209 has a first trunnion 212 secured thereto, the other end of the trunnion being slidably mounted in a sleeve bearing 213. The bearing is secured to an eccentric 214 comprising a pin 215 pivoted in a collar 216 by suitably arranged bearing means.

Collar 216 is secured to a sprocket 217 and a stub shaft 218, mounted for rotation in table 211. The upper end of the stub shaft is operatively connected to a shuttle means via a second eccentric 219. The shuttle means is arranged to engage a trailing edge of the blank to move it toward opening station 300 after cup 202 has released its vacuum. The second eccentric comprises collar 220 having a pin 221 rotatably mounted therein by suitable bearing means. A sleeve bearing 222 is secured to the pin and slidably mounts a second trunnion 223 therein.

The other end of the trunnion is attached to a bellcrank or bracket 224, suitably journalled in table 211 by means of a stub shaft 225. The bracket has horizontally disposed and spaced rods 226 and 227 attached thereto. Pushers 228 and 229 are mounted on ends of the respective rods. The pushers comprise hook portions, such as 230 for pusher 228 (FIG. 8a), formed therein for blank engaging and moving purposes, i.e. to move the blank substantially transversely relative to the blank's linear flight in station 100.

It can be seen that rotation of sprocket 217 will function to rotate eccentric 214 to swivel bracket 207 to move suction cup 202 into engagement with a carrier blank retained in the magazine (FIGS. 5 and 5a). Simultaneously therewith, sprocket 217 functions to swivel bracket 224 to engage the trailing edge of the blank by pushers 228 and 229. The blank is moved over idler rollers 230 and 231 to position the leading edge thereof between pinch rollers or accelerating means 232 and 233.

It should be noted in FIG. 5a that the rounded end of guide rail 107 and idler roller 231 comprise deflecting means arranged to precisely deflect only the forward blank out of the magazine. The next blank will remain undisturbed in the magazine due to this arrangement. The force required to push the blank (via the shuttle means) is necessarily greater than the frictional force normally existing between the two forward-most blanks. Roller 231 is preferably adjustably mounted on table 211 (FIG. 5) to precisely set the deflecting means for a particular feeding application. In contrast to conventional gating arrangements, the deflecting means is insensitive to variations in paperboard caliper and the like. As clearly illustrated in FIG. 6, the idler rollers are mounted for rotation by suitable bearing means on upstanding shafts 234 and 235, respectively, secured to the stationary table.

Figure 9:
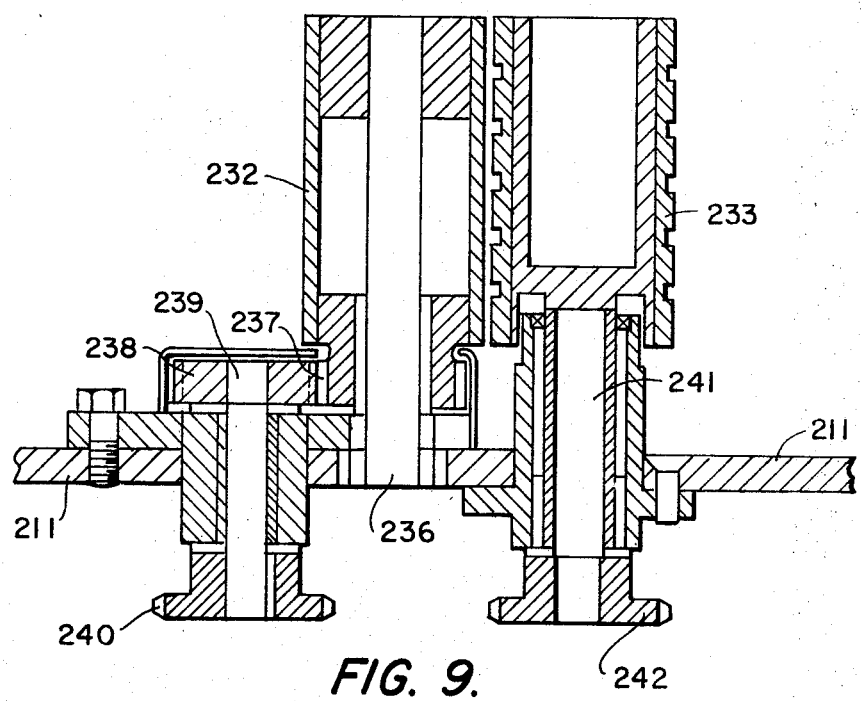
FIG. 9 is an enlarged sectional view taken on line 9—9 in FIG. 5.

Referring to FIG. 9, pinch roller 232 is rotatably mounted on a shaft 236 secured to table 211. A gear 237 is mounted on the lower end of the roller and arranged to mesh with a gear 238 secured to a shaft 239. Shaft 239 is rotatably mounted in stationary table 211 and has a sprocket 240 secured to the lower end thereof. Roller 233 is secured to a shaft 241, rotatably mounted in table 211. Shaft 241 has a sprocket 242 secured to its lower end, arranged to be integrated into a drive train of the apparatus along with sprocket 240.

Such drive train is illustrated in FIG. 22 and will be hereinafter more fully described. It should be noted that the apparatus could function without utilizing rollers 232 and 233. However, such use of the rollers is preferred for most carrier blank erecting applications.

Figure 10:
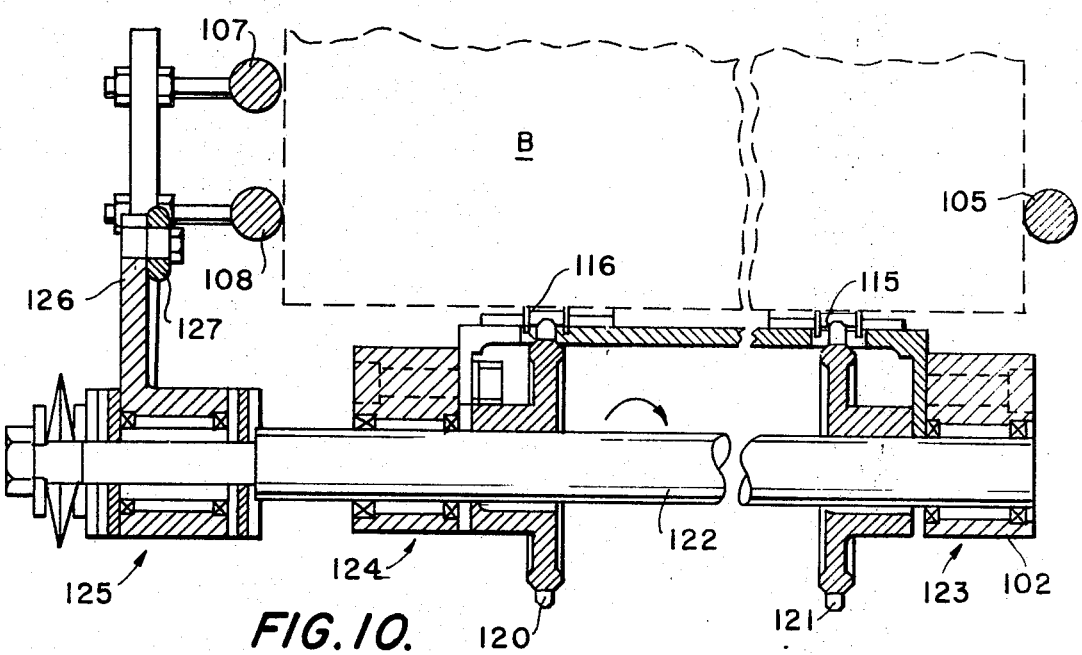
FIG. 10 is an enlarged sectional view taken on line 10—10 in FIG. 5.

Referring to FIGS. 5, 6 and 10, chains 115 and 116 are driven by sprockets 120 and 121, respectively. The sprockets are secured to a shaft 122, suitably journalled in spaced bearing arrangements 123 and 124. Shaft 122 is arranged to intermittently move chains 115 and 116 toward carton feeding station 200 by two suitably arranged one-way clutches or clutch means 125. The one-way clutches are arranged to function opposite with respect to each other, i.e. they are free wheeling in opposite directions to prevent retrograde movement of the first conveying means.

An arm 126 is operatively connected at a first end thereof to a link 127. The other end of the link is pivotally mounted by a pin 128 to an eccentric arrangement 129. Such arrangement comprises a rotatable collar 130 secured to a shaft 131. The shaft is journalled by suitable bearing means in frame 102. A drive sprocket 132 is secured to the other end of the shaft and adapted to be integrated in the hereinafter described drive train for the apparatus.

As will be hereinafter more fully explained, a rotary member 243 (FIGS. 5 and 7) is preferably arranged between stations 200 and 300 to aid in the blank transfer and positioning functions. Member 243 comprises spaced lugs 244 and 245 and is mounted on a shaft 246. The shaft is journalled for rotation in table 211. A sprocket 247, attached to the lower end of the shaft, is arranged to be integrated into the hereinafter described drive train, along with a cam 248 (FIGS. 6 and 22). The cam is arranged to selectively open and close a valve 249 to alternately communicate the above mentioned vacuum source or ambient air pressure to first suction cup 202.

OPENING STATION 300

Figure 11:
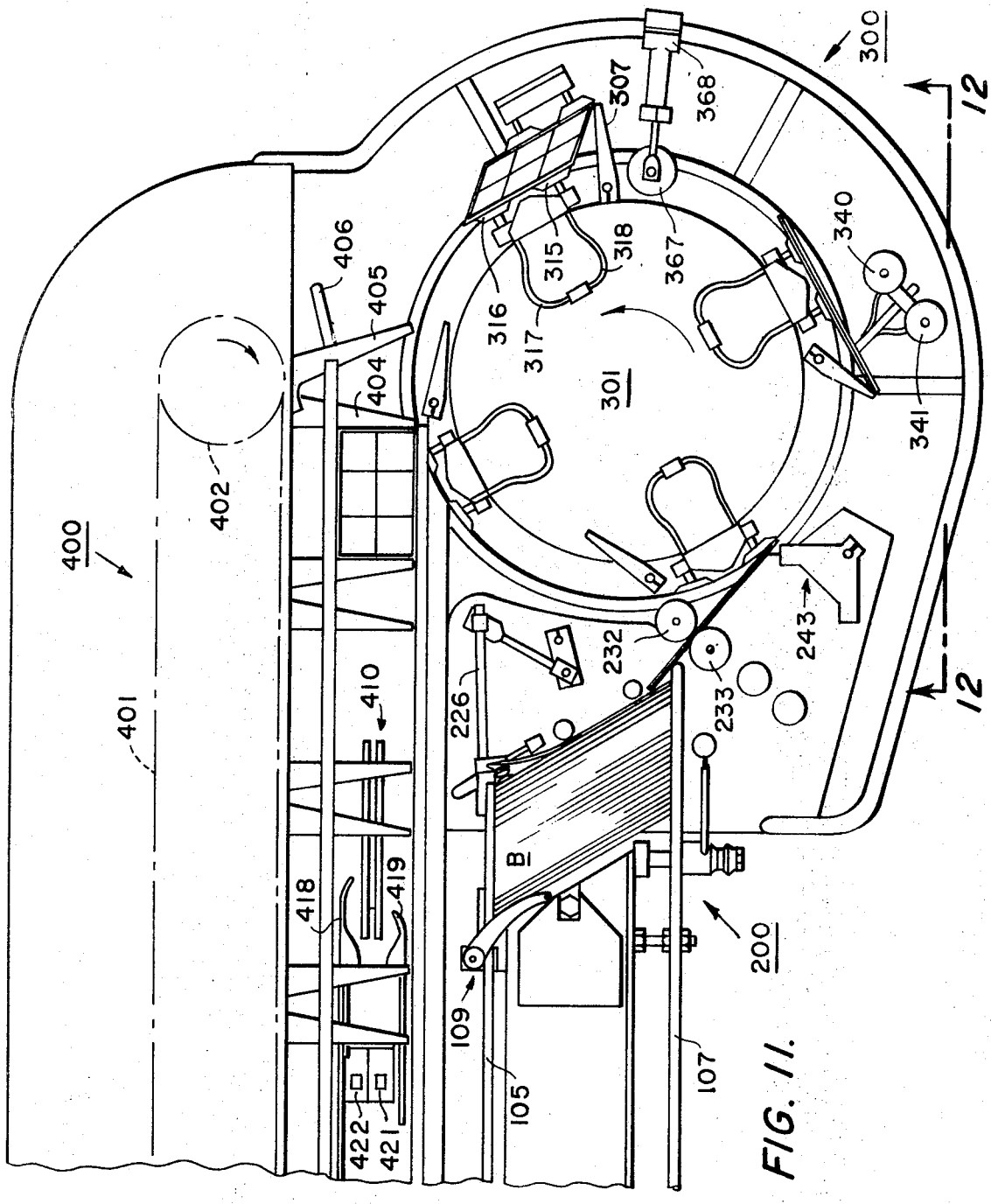
FIG. 11 is an enlarged top plan view of the feeding and opening stations employed in the FIG. 1 apparatus.
Figure 12:
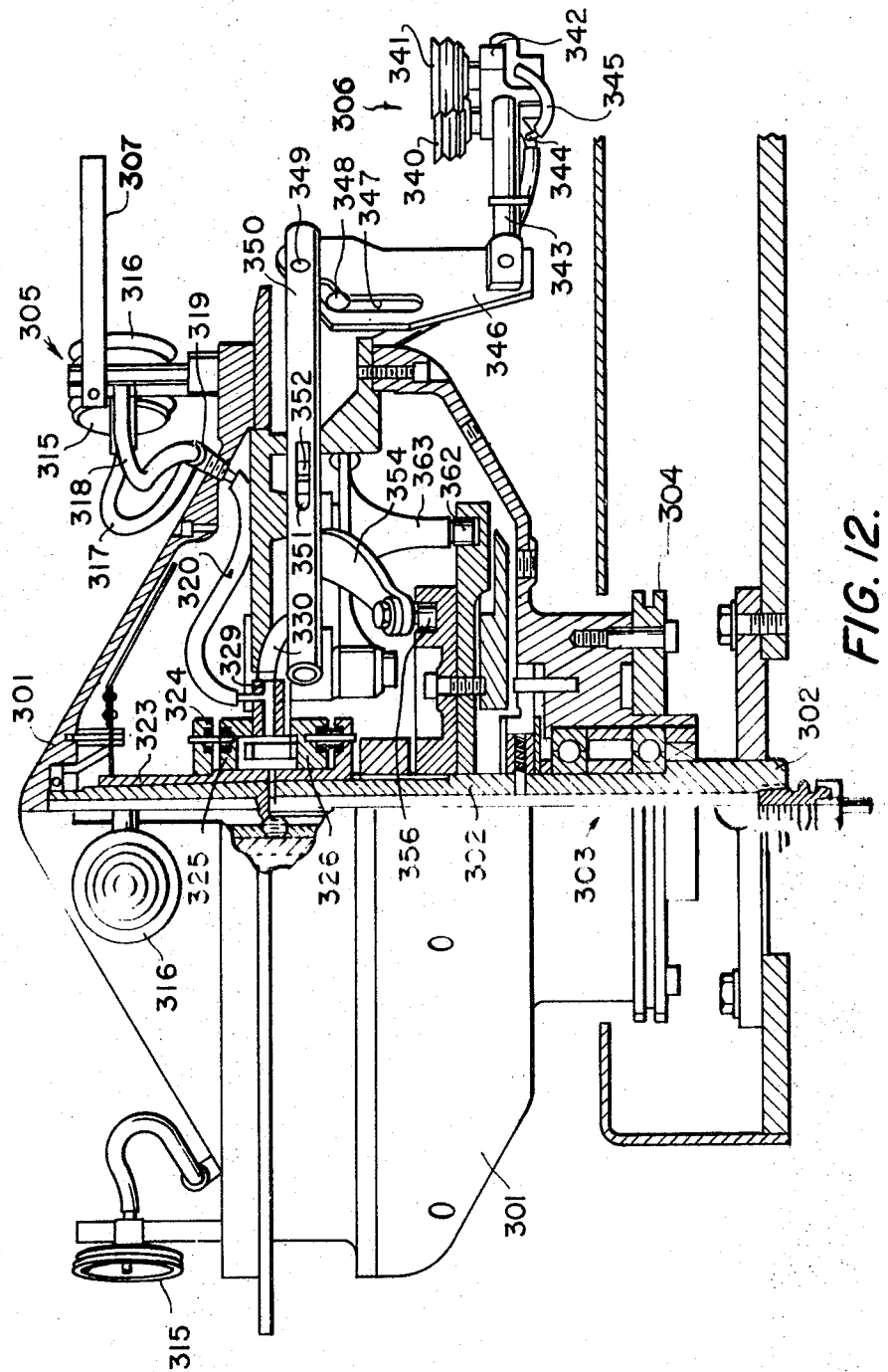
FIG. 12 is an enlarged elevational view in half-section of a turret employed in the opening station, taken in the direction of arrows 12—12 in FIG. 11.
Figure 13:
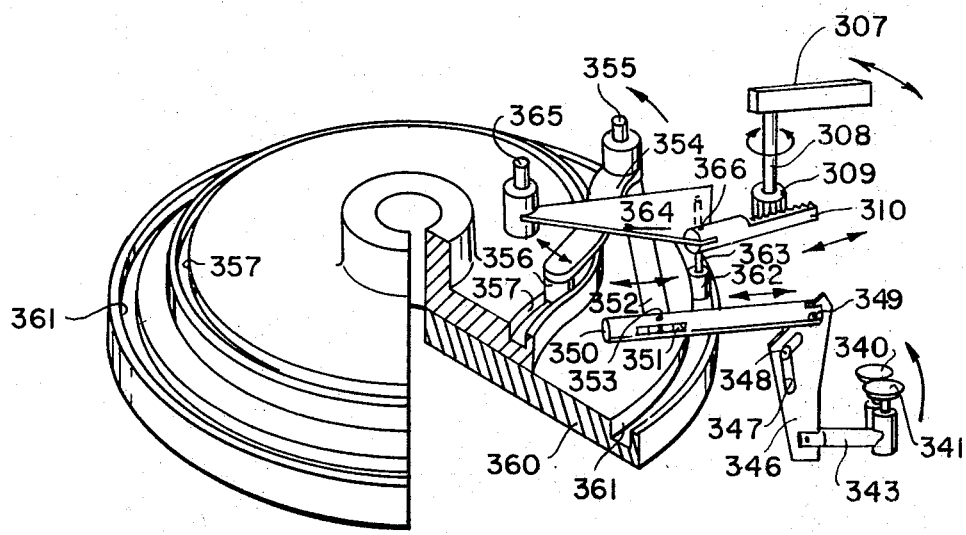
FIG. 13 is a partially sectioned isometric view of actuating mechanisms employed in the opening station.

Referring to FIGS. 11 through 14, opening station 300 comprises a bowl-shaped housing or turret 301 mounted for rotation on vertically disposed stationary column 302 by spaced bearings 303 (FIG. 12). The turret is arranged to be driven by a bull gear 304 secured to the lower end thereof. Four blank opening means are each arranged to pick up and open a blank to a substantially rectangular form as illustrated in FIG. 11. In particular, upon each full rotation of turret 301 a stationary suction assembly 305 (or second suction cup means) is arranged to cooperate with a movable suction cup assembly 306 (or third suction cup means) and pivoted arm means 307 to open the blank.

The partially erected carrier is then transferred to a conveyor in folding and gluing station 400. Arm means 307 is secured to a shaft 308 journalled in suitably arranged bearings (not shown) for pivotal movements on the turret. A pinion gear 309 (FIG. 13) is secured to the lower end of shaft 308 to impart pivotal movements thereto via a reciprocally mounted rack gear 310 in a manner hereinafter explained. The bar functions to backup the blank when it is engaged by the cups of assembly 306 as well as to complete the blank's opening.

Each stationary suction cup assembly 305 is mounted on the turret to engage and grasp a first side panel of the blink. In the preferred embodiment, four such assemblies are so mounted with each assembly comprising two flexible suction cups 315 and 316 of conventional design. The bellow-type wall construction of the cup is preferably quite thin to enable the cup to grasp a blank even though the cup is slightly misaligned therewith. The faces of the cups are preferably arranged to substantially lie in a plane arranged tangentially relative to the outer periphery of turret 301.

In order to achieve the grasping function, a below ambient air pressure or vacuum is communicated from a vacuum means via flexible conduits 317 and 318 to the chambers formed in the respective cups. A suitable fitting 319 is arranged to communicate the two conduits to a third inlet conduit 320. Each cup preferably comprises a reciprocal valve stem arranged to be depressed by an edge of lug 244 or 245 through panels of the blank to expose the above cup chambers to the vacuum immediately upon such depression. In certain applications the valve stems could be eliminated, i.e. to continuously communicate the cups' chambers to conduit 320.

Figure 14:
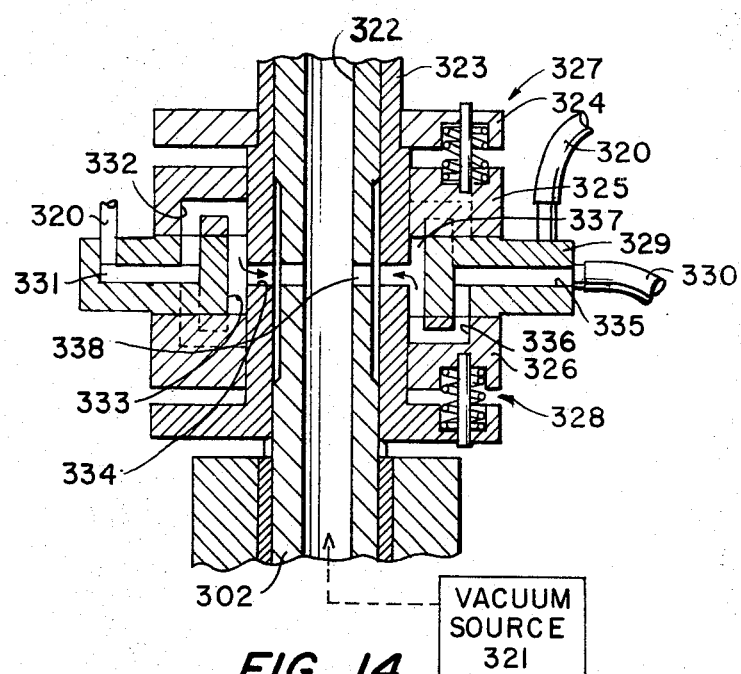
FIG. 14 is an enlarged cross-sectional view illustrating a vacuum arrangement employed in the opening station.
Figure 15:
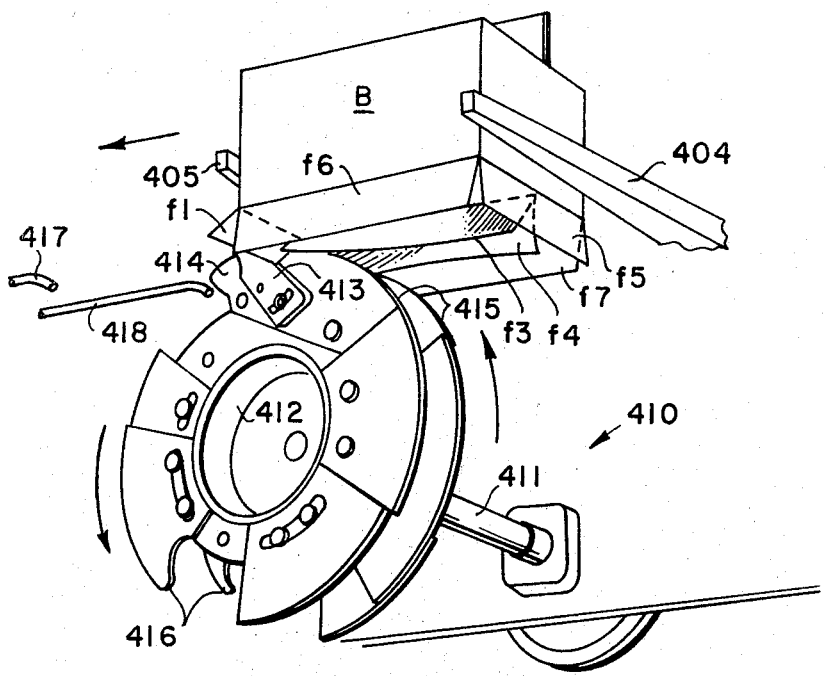
FIGS. 15–18 are a series of enlarged and reversed isometric views of a folding wheel employed in a folding and gluing station of the FIG. 1 apparatus.

The vacuum means is illustrated in FIGS. 14 and 14a and comprises a vacuum source 321 arranged to selectively and intermittently communicate a vacuum to conduit 320. A passage 322 is formed in stationary column 302 to suitably communicate with the vacuum source. The column has a sleeve 323 secured thereto, arranged to non-rotatably mount ring shaped members 324, 325 and 326 thereon.

Circular cut-outs are preferably formed in opposing faces of members 324 and 325 to retain a plurality of radially disposed compression spring assemblies 327 therein. The assemblies are constructed and arranged to urge members 325 and 326 into sealing relationship with a ring member 329. The latter ring member is preferably the only one arranged to rotate with turret 301. A conduit 330 is arranged to selectively and intermittently communicate the vacuum source to second suction cup assemblies 306.

A plurality of passages 331–338 are formed in the ring members to intermittently communicate a vacuum or ambient air pressure to conduits 320 and 330. In particular, passage 331 is formed in rotatable member 329 to communicate with stationary cups 315 and 316 via conduits 317, 318 and 320, and passages 332 and 333. A vacuum is intermittently communicated to movable cups 340 and 341 via conduits 330, 344 and 345 and passages 335, 336 and 337. Arcuate vacuum passage 336 (FIG. 14a) is followed by a shorter arcuate passage which functions to communicate ambient air pressure to the latter cups via the illustrated radial drill port. The under surface of member 325 would have an appearance similar to the top surface of member 326 except that the two arcuate passages formed thereon would be arranged somewhat differently radially to communicate a vacuum or ambient air pressure to cups 315 and 316 in a different time sequence.

U.S. Pat. No. 3,242,827, assigned to the assignee of this application, more fully describes the construction and function of a similar vacuum means. The teachings included in such patent may be referred to should it prove desirable to employ structures thereof in the instant apparatus. For example, the speed at which the apparatus erects carriers may be increased substantially over two hundred per minute. In such an application, the means disclosed in the above patent for intermittently exposing vacuum cups 202, 315, 316, 340 and/or 341 to an above ambient air pressure may be incorporated into this apparatus in lieu of the above-mentioned ambient inducing radial drill ports.

Each movable suction cup assembly 306 (FIGS. 12 and 13) preferably comprise rubber cups 340 and 341 suitably mounted on a bracket 342 attached to a rod 343. Conduits 344 and 345 are suitably arranged to communicate second inlet conduit 330 to the cups in the same manner as described above, regarding cups 315 and 316. Rod 343 is secured to a linkage means comprising a lever 346, having a substantially L-shaped slot 347 formed therein. The slot is arranged to receive a pin 348, secured to turret 301, to control the horizontal and vertical movements of cups 340 and 341 in a vertically disposed plane. A pin 349 pivotally mounts the other end of lever 346 to a first end of a reciprocal rod 350.

Rod 350 has a slot 351 formed therethrough arranged to receive a flattened end of a first arm 352 of a bellcrank therein. The rod and arm are pivoted to each other by means of a pin 353. The bellcrank further comprises a second arm 354 secured to arm 352. The bellcrank is pivoted to the turret at the juncture of its two arms by pivot pin 355. A cam follower 356 is rotatably mounted on arm 354 and arranged to engage a cam track 357. The track is formed in a first stationary cam plate 358 attached to column 302.

A second stationary cam plate 360 has a cam track 361 formed therein and arranged to capture and control the movements of a follower 362. A pivot pin 363 rotatably mounts the follower thereon and is further pivotally connected to a plate 364. The plate is pivotally mounted on a pin 365 arranged to be secured to the turret. A pivot pin 366 mounts a bifurcated end of gear rack 310 to plate 364 to permit the gear rack to oscillate pinion gear 309 to swivel bar 307.

A disc or plow means 367 is preferably mounted on a stationary column 368, arranged adjacent to the turret. The plow means functions to break a perforated tearline normally securing the blank's side panels together. Above mentioned U.S. patent application Ser. No. 551,263 fully discloses such a tearline arrangement.

FOLDING, GLUING AND DISCHARGE STATION 400

Referring to FIGS. 1, 11 and 15–20, this station comprises a second conveying means, preferably in the form of an endless chain 401. The chain is mounted on sprockets 402 and 403 for moving the opened blanks, now forming partially erected carriers, along a substantially linear path. The chain has first and second lugs or pusher arms 404 and 405, respectively, mounted thereon to form a series of pockets for receiving the opened blanks therein. A pusher bar means 406 is preferably attached to each alternate second lug 405 to divide and discharge the fully erected carriers into two separate lines.

FIG. 21 illustrates a stationary V-shaped dividing means 407 preferably arranged to cooperate with the second conveying means to aid in such discharge function. In particular, as a leading carrier B is moved leftwardly in this figure such carrier will be moved onto the upper ramp portion of the dividing means. Bar 406 will function to move and laterally displace the next following carrier B' relative to the above-mentioned linear path. The latter group of carriers are thus moved onto the lower ramp portion of the dividing means.

Referring to FIGS. 15–18, the means for folding and gluing the blank's bottom closure flaps $f_1$–$f_7$ together comprises a folding wheel 410. The wheel is keyed or otherwise suitably secured to a rotatable shift 411 arranged beneath the second conveyor means. The folding wheel comprises a cylindrical hub 412 suitably secured to the shaft and arranged to carry a plurality of radially extending plows thereon. The plows are arranged to perform a majority of the flap folding and dividing functions.

The plows are preferably adjustably mounted on the hub by suitably arranged conventional slot and screw means (not fully illustrated). Such adjusting means are arranged to permit radial and/or rotary adjustment of the plows on the hub. In addition, suitably arranged shims may be utilized to adjust the width of one or more plows in the direction of the longitudinal axis of shaft 411. Thus, the wheel may be selectively adjusted to accommodate it for the folding of flaps and carriers having various dimensions.

Figure 16:
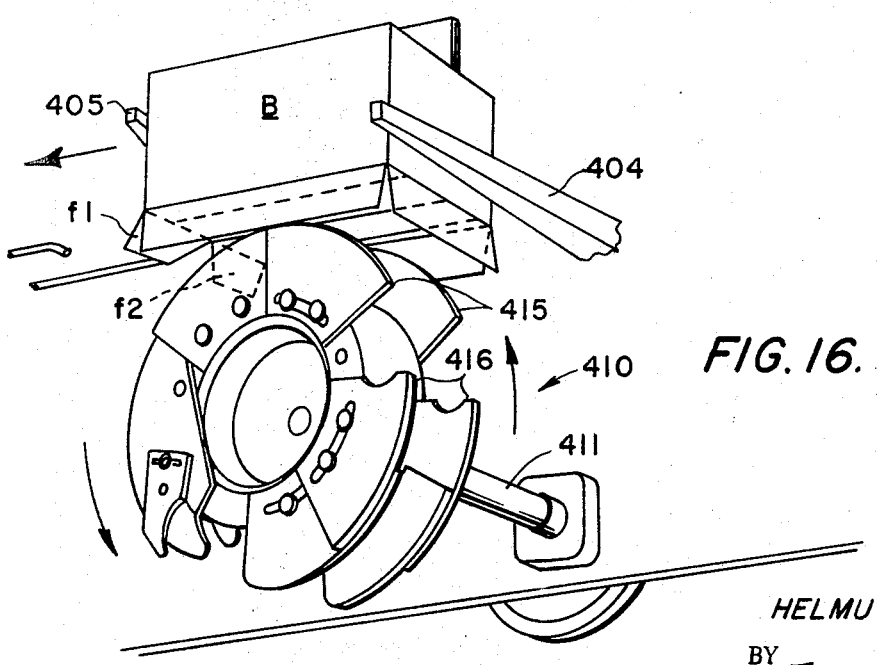
Figure 17:
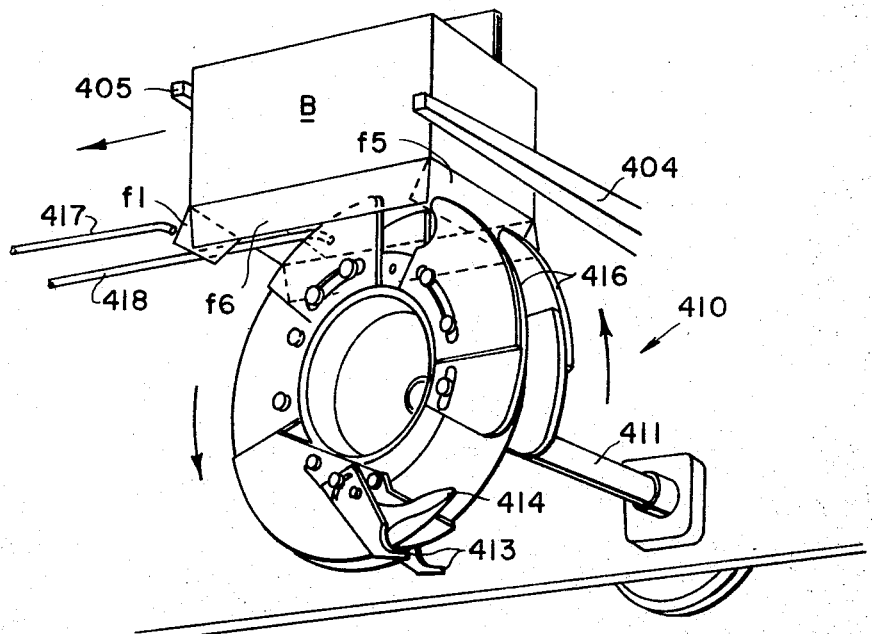
Figure 18:
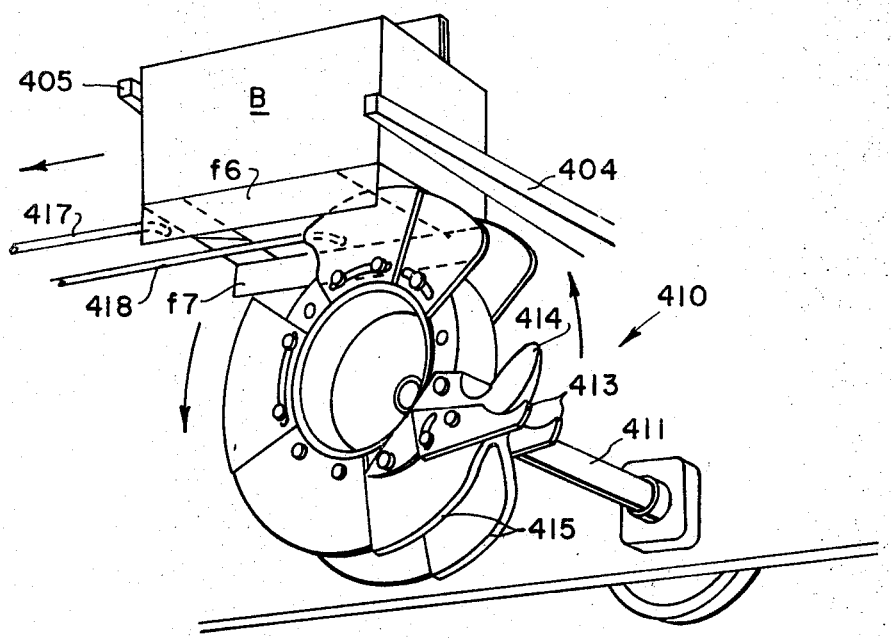

Spaced plows 413 are arranged to fold flaps $f_1$ and $f_2$ forwardly in the direction of blank flight (FIG. 15) shortly after a centrally disposed plow 414 spreads flaps $f_3$ and $f_4$ apart. Spaced plows 415 are arranged to then complete the folding of the latter flaps to a horizontally disposed position (FIG. 16). Flap $f_5$ is then folded forwardly onto flaps $f_3$ and $f_4$ by spaced plows 416 (FIG. 17). Substantially simultaneously with the last folding sequence, stagered and horizontally disposed stationary plow bars 417 and 418 function to sequentially fold flaps $f_1$ and $f_2$ onto flaps $f_3$ and $f_4$, respectively (FIGS. 18 and 19). Flap $f_5$ is held in a horizontally disposed position by plows 416 until such flap is moved onto the stationary plow bars.

The conveyor then moves the carrier toward the discharge end of the conveyor with all flaps arranged in a horizontally disposed position on plow bars 417 and 418, except flaps $f_6$ and $f_7$. As illustrated in FIG. 19, the latter two flaps will be maintained vertically in slots 419 and 420, respectively. The conveying means then moves the horizontally disposed flaps over gluing means 421 and 422.

The gluing means preferably comprises conventional glue guns arranged to discharge a standard adhesive therefrom when the carrier engages and trips a trigger 423 of a hereinafter described sensing means. The glue or other suitable adhesive is preferably applied to horizontally disposed flaps $f_1$–$f_5$. Flaps $f_6$ and $f_7$ are then folded thereon by curved stationary plows 424 and 425, respectively. A guide rail 426 may be arranged to cooperate with plows 424 and 425 to compress the flaps together until the glue is set.

The glue pattern is preferably controlled by the control means schematically illustrated in FIG. 20. The above-mentioned sensing means 427, preferably comprising a conventional first microswitch arranged to be actuated by trigger 423, may be incorporated into the control means. Alternatively, the sensing means could constitute a conventional "electric eye" arrangement or the like. The control means further comprises a cam 428 secured to a rotatable shaft 429 and arranged to engage a follower 430 to selectively actuate a second microswitch and valve assembly 431. Upon engagement of a raised portion of cam 428, follower 430 will function to actuate the second microswitch to open the valve (so long as the first microswitch is also actuated).

Such opening will function to communicate glue to the glue guns from a pressurized glue source 432. The glue patterns may be varied by changing the shape of the cam. It should be noted that if a carrier blank is not retained in a pocket formed between adjacent bars 404 and 405, that trigger 423 will not be tripped. The sensing means 427 will then function in a conventional manner to override the second microswitch contained in assembly 431 to prevent actuation of the glue guns. It should be understood that flaps $f_1$–$f_7$ could be attached together mechanically rather than gluing them together.

INTEGRATED DRIVE TRAIN

FIG. 22 schematically illustrates the integrated drive train for the above described apparatus. A main, electrically actuated drive motor 435 is arranged to drive an output pulley at a predetermined speed. The pulley in turn actuates a torque limiter 436 preferably comprising a conventional speed control clutch. The clutch is arranged to be engaged selectively to drive a shaft 437, connected to sprocket 403 to drive conveyor 401. The conveyor drives sprocket 402, fixedly mounted on a rotatable shaft 438. The shaft further mounts a sprocket 439 thereon arranged to drive shaft 411 and folding wheel 410 via suitably arranged drive mechanisms 440. Shaft 438 further drives a sprocket 441, arranged to drive bull gear 304 attached to turret 301 (FIG. 12).

In addition, sprocket 441 sequentially drives a sprocket 442, a rotatable shaft 443 and a sprocket 444. The latter sprocket is suitably arranged to drive a sprocket 445, mounted on rotatable shaft 429. The shaft has cam 428 mounted thereon (FIG. 20) along with cam 248. As above described, cam 428 controls the glue pattern emitted by guns 421 and 422 at station 400 whereas cam 248 controls the actuation of a valve 249 to communicate a vacuum source intermittently to vacuum cup 202 (FIG. 6).

The shaft further has a sprocket 446 secured thereto to drive sprockets 240 and 242 to in turn drive pinch rollers 232 and 233 (FIG. 9). Another sprocket 447 is mounted on the shaft and arranged to drive endless conveyors 115 and 116 intermittently via sprocket 132, eccentric 129, link 127, one-way clutch 125, shaft 122 and sprockets 120 and 121. Sprocket 447 further drives sprockets 217 and 247, the latter sprockets being arranged to swivel vacuum cup 202 and pushers 228 and 229 (FIG. 8) and to rotate member 243 (FIG. 7), respectively.

It should be understood that the schematically illustrated and briefly described drive train is somewhat more sophisticated in actual application. In particular the desired speed ratios are suitably designed into the system to actuate the various mechanisms at predetermined speeds for proper blank feeding and erecting purposes. As mentioned above, in actual practice the apparatus was found capable of erecting approximately 200 carriers per minute.

FILLING STATION 500

FIGS. 23 and 24 illustrate a modification of the above described apparatus comprising the addition of a filling station thereto. The filling station essentially functions to convey a plurality of containers, such as bottles D, to the opened blank and insert them upwardly therein. In particular, such bottles may be conveyed in groups of six towards the second conveying means by a third conveying means comprising a plurality of endless chains 501. The chain may be suitably driven by a sprocket 502, operatively integrated into the FIG. 22 drive train.

The chains may be further arranged to rotate star wheels 503 which function to push the bottles upwardly past the bottom closure flaps of the opened blank and onto stationary ramps 504. The third conveying means is thus arranged below the second conveying means, comprising lugs 404a and 405a, to smoothly effect the filling function. The filled blanks are then moved over rotary wheel 410a to commence the formation of the carrier's bottom closure.

Preferred method for erecting carrier blanks

The methods hereinafter described may be accomplished on the above described apparatus. However it will be readily understood that such methods could be accomplished on other types of apparatus and in many instances by hand.

Figure 3:
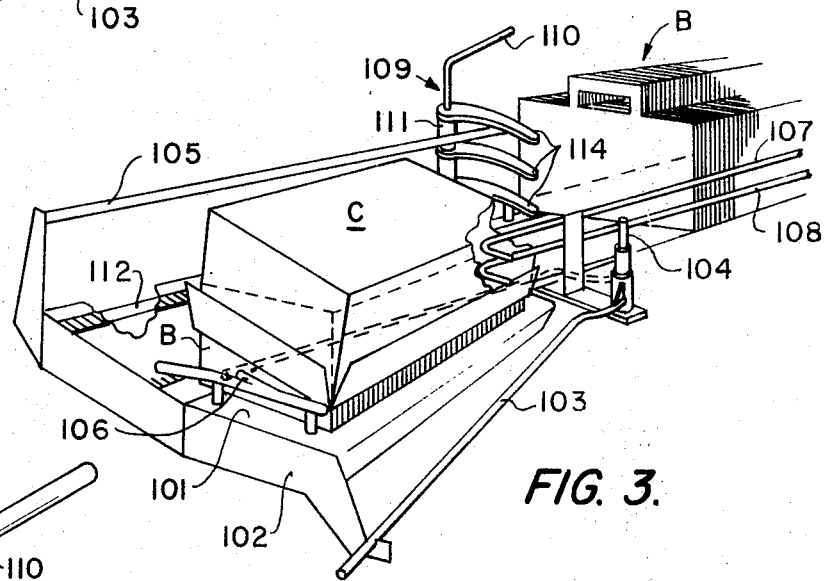
FIG. 3 is a rear perspective view of the loading station.

Main drive motor 435 (FIG. 22) is actuated to set the above described blank feeding and erecting mechanisms in motion. The loading method commences when the operator places corrugated case C, containing a plurality of flattened carrier blanks B, onto table 101 (FIG. 3). The case is removed for positioning the blanks in an upright position on the table. Pusher bar 103 is grasped manually for engaging front edges of the blanks. The blanks are then pushed along a substantially linear path a sufficient distance to engage the rear edges thereof with guide rail 105. The bar is preferably locked behind lug 106 to form an extension of guide bar 107.

Assembly 109 is then moved behind the blanks and locked to chain 115 via pin 113 for conveying the blanks along a linear path arranged perpendicular to the first mentioned one. Chains 115 and 116 are preferably arranged to provide a slight frictional engagement with bottom portions of the blanks to aid in the conveying step. As above described, rails 105 and 107 are preferably arranged for maintaining the blanks at an oblique angle (preferably thirty degrees to eighty degrees) relative to the linear flight of the blanks.

The conveying and feeding method essentially comprises feeding the blanks out of such linear path and into opening station 200. Suction cup 202 (FIGS. 5 and 5a) is arranged for grasping and bending a trailing end of a forward blank out of the magazine wherein it is retained. Valve 249 (FIG. 6) is then actuated to release the vacuum to cup 202 and expose the cup to ambient air pressure. Substantially simultaneously therewith, pushers 228 and 229 engage an edge of the blank's trailing end to feed the blank out of the magazine. Idler roller 231 and the rounded end of guide bar 107 cooperate for deflecting the forward blank only out of the magazine.

Pinch rollers are arranged for grasping the leading end of the blank and accelerating the speed at which the blank is fed out of the magazine. Such speed preferably approximates the tangential speed of turret 301 and thus the rotary speed of stationary suction cups 315 and 316 (FIG. 11). The turret rotates to permit suction cup assemblies 305 and 306 to grasp first and second side panels of the blank to move them away from each other to partially open the blank. Rotary member 243 is preferably arranged for forcing the blank into place onto the two stationary cups and to actuate the reciprocal valve stems thereof via edges of lugs 244 and 245. Depression of the cups' valve stems permits the vacuum means (FIGS. 14 and 14a) to communicate a vacuum to the cups immediately to effect the blank grasping function.

It should be noted that during the herein described opening method that movable suction cups 340 and 341 are maintained in a substantially horizontal position during the blank pick up step thereof. The turret continues to rotate to carry the blank past rotary plow 367 for breaking the tearline connecting the opposed side panels of the blank together. Cam 357 and its attendant linkage means are arranged for moving the latter cups vertically upwardly and horizontally inwardly (approximately two inches in actual application) to engage the second side panel.

After grasping the second side panel, cups 340 and 341 move horizontally outwardly and then vertically downwardly to partially open the blank. The cups release therefrom substantially at the point whereat such horizontal movement changes to a vertical one by subjecting the cups to an ambient air pressure via the above described radial drill port formed in member 326 (FIG. 14a). Arm means 307 continues to rotate to fold the trailing end panel of the blank, connected between the side panels thereof, to open the blank to substantially rectangular form (FIG. 11). The arm means preferably begins its engagement with the blank before cups 340 and 341 engage the blank to provide a backup force therefor.

The turret continues to rotate and transfers the substantially erected carrier into a pocket formed between two adjacent lugs or pusher arms 404 and 405. The above-described vacuum means preferably functions to break the vacuum to the stationary suction cups, via the radial drill port (not shown) formed in member 325, a moment prior to the transferring step. Cups 340 and 341, after they have released themselves from the second side panel of the carrier, move under stations 400 and 200 to initiate another opening step.

Conveyor 401 is arranged for conveying the carriers along a linear path and over folding wheel 410. Bottom closure flaps $f_1$–$f_7$ are maintained beolw such path to engage the wheel. The wheel functions to impart a rotary motion to a majority of the flaps to bend them into superimposed position (FIGS. 15–18). Each carrier engages and trips trigger 423 to actuate glue guns 421 and 422 for applying a suitable adhesive onto flaps $f_1$–$f_5$ (FIG. 19). Plows 424, 425 and 426 fold and compress the flaps into position to set the adhesive.

Thereafter, the method for dividing the erected carriers into two groups is carried forth by continuing to convey the carriers along a linear path in the pockets formed by lugs 404 and 405. Lugs 406 are arranged for engaging and displacing alternate ones of the carriers (B′) laterally relative to the linear path. Dividing means 407 is arranged for dividing the carriers into two separate lines with alternate carriers B′ forming one of the lines.

FIGS. 23 and 24 disclose a modified method which further comprises the steps of conveying a plurality of bottles or like containers D and inserting them upwardly into the opened carrier. The linear path of the bottles preferably intersects the linear path of the second conveying means as illustrated in FIG. 23. Star wheel 503 is preferably arranged to push the bottles upwardly a sufficient distance to assure clearance of the carrier's bottom closure flaps. Horizontally disposed bars 504 are arranged for fully supporting the bottles prior to their flight through the folding and gluing station.

I claim:
1. An apparatus for erecting a blank into a basket style carrier comprising loading, feeding, opening and folding and gluing stations arranged in series;

said loading station comprising a magazine for maintaining a stack of flattened carrier blanks in an upright and vertically disposed position therein, and a first horizontally disposed conveying means for moving said blanks along a first substantially linear path toward said feeding station;

said feeding station comprising feeding means for moving blanks individually out of said magazine and toward said opening station while simultaneously maintaining said blanks in said upright position and deflecting means arranged to cooperate with said feeding means for precisely deflecting only a forward blank of said carrier blanks out of said magazine;

said opening station comprising a horizontally disposed turret rotatably mounted between said feeding and folding and gluing stations, first suction cup means mounted on said turret for grasping a first side panel of said blank when said blank is moved to said opening station from said feeding station, and second suction cup means movably mounted on said turret to cooperate with said first suction cup means for grasping and moving a second side panel of said blank away from the first side panel thereof to open said blank during rotation of said turret means;

said folding and gluing station comprising a second horizontally disposed conveying means for receiving said opened blank from said opening station in said upright position and for moving the opened blank along a second substantially linear path in said upright position through said folding and gluing station, and means for folding and attaching bottom closure flaps of said opened blank together to form an erected carrier.

2. The invention of claim 1 wherein said loading station further comprises pushing means movably mounted at said loading station for pushing said stack of carrier blanks toward said conveying means.

3. The invention of claim 1 wherein said loading station further comprises first and second substantially parallel guide rails mounted therein at a predetermined distance from each other and in substantially parallel relationship with respect to said line of flight for engaging opposite edges of said blanks to cooperate with said first conveying means for moving said blanks toward said feeding station.

4. The invention of claim 1 wherein said conveying means comprises a pusher assembly arranged to be positioned behind said blanks to engage and move them along said linear path.

5. The invention of claim 4 wherein said pusher assembly is slidably mounted on a stationary bar arranged adjacent and substantially parallel to said linear path.

6. The invention of claim 4 wherein said conveying means further comprises an endless chain and means formed on said pusher assembly and said endless chain for selectively locking said pusher assembly to said endless chain.

7. The invention of claim 1 further comprising drive means for moving said first conveying means intermittently.

8. The invention of claim 1 wherein the feeding means of said feeding station comprises cooperating suction cup means and shuttle means movably mounted in said feeding station.

9. The invention of claim 1 further comprising accelerating means mounted in said feeding station for receiving said blank from said feeding means and for moving said blank at a speed greater than imparted to said blank by said feeding means.

10. The invention of claim 8 further comprising means mounting said suction cup means and said shuttle means in said feeding station for swivel movements toward and away from said magazine.

11. The invention of claim 1 wherein said opening station further comprises arm means movably mounted on said turret to cooperate with said first and second suction cup means to substantially fully open said blank to a rectangular form.

12. An apparatus for erecting a blank into a basket style carrier comprising loading, feeding, opening and folding and gluing stations arranged in series;

said loading station comprising a magazine for maintaining a stack of flattened carrier blanks in an upright and vertically disposed position therein, and a first horizontally disposed conveying means for moving said blanks along a first substantially linear path toward said feeding station;

said feeding station comprising feeding means for moving blanks individually out of said magazine and toward said opening station while simultaneously maintaining said blanks in said upright position;

said opening station comprising a horizontally disposed turret rotatably mounted between said feeding and folding and gluing stations, first suction cup means mounted on said turret for grasping a first side panel of said blank when said blank is moved to said opening station from said feeding station, second suction cup means movably mounted on said turret to cooperate with said first suction cup means for grasping and moving a second side panel of said blank away from the first side panel thereof to open said blank during rotation of said turret means, and arm means movably mounted on said turret to cooperate with said first and second suction cup means to substantially fully open said blank to a rectangular form;

said folding and gluing station comprising a second horizontally disposed conveying means for receiving said opened blank from said opening station in said upright position and for moving the opened blank along a second substantially linear path in said upright position through said folding and gluing station, and means for folding and attaching bottom closure flaps of said opened blank together to form an erected carrier.

13. The invention of claim 12 further comprising actuating means for simultaneously actutaing said second suction cup means and said arm means.

14. The invention of claim 1 further comprising a member rotatably arranged adjacent to said turret for forcing said blank against said suction cup means upon rotation of said turret.

15. The invention of claim 1 further comprising plow means arranged adjacent to said turret for engaging and breaking a scoreline formed on said blank upon rotation of said turret.

16. The invention of claim 13 wherein said actuating means comprises a stationary cam and linkage means operatively associating said stationary cam with said second suction cup means and said arm means.

17. The invention of claim 13 wherein said actuating means comprises a stationary cam and linkage means operatively associating said stationary cam with said arm means.

18. The invention of claim 1 wherein said opening station further comprises vacuum means operatively associated with said first and second suction cup means to selectively and intermittently communicate a vacuum thereto upon rotation of said turret.

19. The invention of claim 18 wherein said vacuum means comprises a ring member arranged to rotate with said turret.

20. The invention of claim 1 wherein said means for folding and gluing the bottom closure flaps of said opened blank comprises a folding wheel rotatably mounted adjacent to and below said second conveying means, said folding wheel having a plurality of radially extending plows mounted thereon.

21. The invention of claim 20 further comprising means adjustably mounting said plows on said folding wheel.

22. The invention of claim 20 further comprising at least one horizontally disposed stationary plow bar arranged adjacent to said folding wheel to cooperate therewith for receiving bottom closure flaps of said opened blank thereon.

23. The invention of claim 20 further comprising gluing means arranged adjacent to and below said second conveying means for discharging an adhesive onto bottom closure flaps of said opened blank.

24. The invention of claim 23 further comprising sensing means arranged adjacent to said second conveying means for inactivating said gluing means when an opened blank is not retained in a pocket formed in said second conveying means.

25. The invention of claim 23 further comprising control means operatively connected to said gluing means for controlling the adhesive pattern discharged from said gluing means.

26. The invention of claim 25 wherein said control means includes a rotatable cam.

27. The invention of claim 1 wherein said second conveying means of said folding and gluing station comprises an enless chain having a plurality of lugs mounted thereon forming a pocket between a pair of adjacent first and second lugs arranged to receive said opened blank therein.

28. The invention of claim 27 wherein one of said pair of lugs has a pusher bar means secured thereto for displacing said opened blank laterally relative to said second substantially linear path.

29. An apparatus for erecting a blank into a basket style carrier comprising loading, feeding, opening and folding and gluing stations arranged in series;
said loading station comprising a magazine for maintaining a stack of flattened carrier blanks in an upright and vertically disposed position therein, and a first horizontally disposed conveying means for moving said blanks along a first substantially linear path toward said feeding station;
said feeding station comprising feeding means for moving blanks individually out of said magazine and toward said opening station while simultaneously maintaining said blanks in said upright position;
said opening station comprising a horizontally disposed turret rotatably mounted between said feeding and folding and gluing stations, first suction cup means mounted on said turret for grasping a first side panel of said blank when said blank is moved to said opening station from said feeding station, and second suction cup means movably mounted on said turret to cooperate with said first suction cup means for grasping and moving a second side panel of said blank away from the first side panel thereof to open said blank during rotation of said turret means;
said folding and gluing station comprising a second horizontally disposed conveying means for receiving said opened blank from said opening station in said upright position and for moving the opened blank along a second substantially linear path in said upright position through said folding and gluing station, second conveying means comprising an endless chain having a plurality of lugs mounted thereon forming a pocket between a pair of adjacent first and second lugs arranged to receive said opened blank therein, one of said pair of lugs having a pusher bar means secured thereto for displacing said opened blank laterally relative to said second substantially linear path, and means for folding and attaching bottom closure flaps of said opened blank together to form an erected carrier.

30. The invention of claim 29 wherein said pusher bar means is secured to each alternate second lug of said pair of lugs.

31. The invention of claim 29 further comprising dividing means arranged adjacent to said second conveying means to cooperate therewith for dividing opened blanks into two separate lines.

32. The invention of claim 1 further comprising third conveying means arranged below said second conveying means for inserting a plurality of containers upwardly into said opened blank prior to when the bottom closure flaps thereof are folded and attached together.

33. An apparatus for erecting a blank into a basket style carrier comprising loading, feeding, opening and folding and gluing stations arranged in series:
said loading station comprising a magzine for maintaining a stack of flattened carrier blanks in an upright position therein, and a first conveying means for moving said blanks along a substantially linear path toward said feeding station;
said feeding station comprising feeding means for moving blanks individually out of said magazine and toward said opening station while simultaneously maintaining said blanks in said upright position, including deflecting means for engaging and precisely deflecting a leading end of a forward flattened blank of said carrier blanks out of said magazine;
said opening station comprising means including oppossed suction cup means mounted on a rotary turret for moving first and second opposed side panels of said blank away from each other to open said blank;
said folding and gluing station comprising a second horizontally disposed conveying means for receiving said open blank from said opening station and for moving the opened blank through said folding and gluing station and means for folding and attaching bottom closure flaps. of said opened blank together to form an erected carrier.

34. In an apparatus for erecting a blank into a basket style carrier comprising loading, feeding, opening and folding and gluing stations arranged in series:
said loading station comprising a magazine for maintaining a stack of carrier blanks in an upright position therein, and a first conveying means for moving said blanks along a first substantially linear path toward said feeding station;
said feeding station comprising feeding means for moving blanks individually out of said magazine and toward said opening station;
said opening station comprising means including opposed suction cup means mounted on a rotary turret for moving first and second opposed side panels of said blank away from each other to open said blank;
said folding and gluing station comprising a second conveying means for receiving said opened blank from said opening station and for moving the opened blank through said folding and gluing station, and means for folding and attaching bottom closure flaps of said opened blank together to form an erected carrier, including a vertically disposed folding wheel rotatably mounted adjacent to and below said second conveying means, said folding wheel having a plurality of radially extending plows mounted thereon.

35. An apparatus for erecting a blank into a basket style carrier comprising loading, feeding, opening and folding and gluing stations arranged in series;
said loading station comprising a magazine for maintaining a stack of flattened carrier blanks in an upright and vertically disposed position therein, and a first horizontally disposed conveying means for moving said blanks along a first substantially linear path toward said feeding station;
said feeding station comprising feeding means for moving blanks individually out of said magazine and toward said opening station while simultaneously maintaining said blanks in said upright position, accelerating means mounted in said feeding station for receiving said blank from said feeding means and for moving said blank at a speed greater than imparted to said blank by said feeding means;
said opening station comprising a horizontally disposed turret rotatably mounted between said feeding and folding and gluing stations, first suction cup means mounted on said turret for grasping a first side panel of said blank when said blank is moved to said opening station from said feeding station, and second suction cup means movably mounted on said turret to cooperate with said first suction cup means for grasping and moving a second side panel of said blank away from the first side panel thereof to open said blank during rotation of said current means;

said folding and gluing station comprising a second horizontally disposed conveying means for receiving said opened blank from said opening station in said upright position and for moving the opened blank along a second substantially linear path in said upright possition through said folding and gluing station, and means for folding and attaching bottom closure flaps of said opened blank together to form an erected carrier.

36. An apparatus for erecting a blank into a basket style carrier comprising loading, feeding, opening and folding and gluing stations arranged in series;

said loading station comprising a magazine for maintaining a stack of flattened carrier blanks in an upright and vertically disposed position therein, and a first horizontally disposed conveying means for moving said blanks along a first substantially linear path toward said feeding station;

said feeding station comprising feeding means for moving blanks individually out of said magazine and toward said opening station while simultaneously maintaining said blanks in said upright position;

said opening station comprising a horizontally disposed turret rotatably mounted between said feeding and folding and gluing stations, first suctions cup means mounted on said turret for grasping a first side panel of said blank when said blank is moved to said opening station from said feeding station, second suction cup means movably mounted on said turret to cooperate with said first suction cup means for grasping and moving a second side panel of said blank away from the first side panel thereof to open said blank during rotation of said turret means, and plow means arranged adjacent to said turret for engaging and breaking a scoreline formed on said blank upon rotation of said turret;

said folding and gluing station comprising a second horizontally disposed conveying means for receiving said opened blank from said opening station in said upright position and for moving the opened blank along a second substantially linear path in said upright position through said folding and gluing station, and means for folding and attaching bottom closure flaps of said opened blank together to form an erected carrier.

37. An apparatus for erecting a blank into a basket style carrier comprising loading, feeding, opening and folding and gluing stations arranged in series;

said loading station comprising a magazine for maintaining a stack of flattened carrier blanks in an upright and vertically disposed position therein, and a first horizontally disposed conveying means for moving said blanks along a first substantially linear path toward said feeding station;

said feeding station comprising feeding means for moving blanks individually out of said magazine and toward said opening station while simultaneously maintaining said blanks in said upright position;

said opening station comprising a horizontally disposed turret rotatably mounted between said feeding and folding and gluing stations, first suction cup means mounted on said turret for grasping a first side panel of said blank when said blank is moved to said opening station from said feeding station, and second suction cup means movably mounted on said turret to cooperate with said first suction cup means for grasping and moving a second side panel of said blank away from the first side panel thereof to open said blank during rotation of said turret means;

said folding and gluing station comprising a second horizontally disposed conveying means for receiving said opened blank from said opening station in said upright position and for moving the opened blank along a second substantially linear path in said upright position through said folding and gluing station, and means for folding and attaching bottom closure flaps of said opened blank together to form an erected carrier comprising a folding wheel rotatably mounted adjacent to and below said second conveying means, said folding wheel having a plurality of radially extending plows adjustably mounted thereon.

38. An apparatus for erecting a blank into a basket style carrier comprising loading, feeding, opening and folding and gluing stations arranged in series;

said loading station comprising a magazine for maintaining a stack of flattened carrier blanks in an upright and vertically disposed position therein, and a first horizontally disposed conveying means for moving said blanks along a first substantially linear path toward said feeding station;

said feeding station comprising feeding means for moving blanks individually out of said magazine and toward said opening station while simultaneously maintaining said blanks in said upright position;

said opening station comprising a horizontally disposed turret rotatably mounted between said feeding and folding and gluing stations, first suction cup means mounted on said turret for grasping a first side panel of said blank when said blank is moved to said opening station from said feeding station, and second suction cup means movably mounted on said turret to cooperate with said first suction cup means for grasping and moving a second side panel of said blank away from the first side panel thereof to open said blank during rotation of said turret means;

said folding and gluing station comprising a second horizontally disposed conveying means for receiving said opened blank from said opening station in said upright position and for moving the opened blank along a second substantially linear path in said upright position through said folding and gluing station, and means for folding and attaching bottom closure flaps of said opened blank together to form an erected carrier; and third conveying means arranged below said second conveying means for inserting a plurality of containers upwardly into said opened blank prior to when the bottom closure flaps thereof are folded and attached together.

References Cited

UNITED STATES PATENTS

| | | | |
|---|---|---|---|
| 2,762,274 | 9/1956 | Kerr | 53—186 XR |
| 1,962,481 | 6/1934 | Clark | 53—186 XR |
| 2,973,608 | 3/1964 | Killion | 53—186 XR |
| 2,756,553 | 7/1956 | Ferguson et al. | 53—186 XR |
| 2,896,569 | 7/1959 | Ferguson et al. | 53—383 XR |
| 3,165,193 | 1/1965 | Stevenson | 198—31 |
| 3,061,985 | 11/1962 | Ganz | 53—186 XR |
| 2,671,385 | 3/1954 | Johenning et al. | 53—186 XR |
| 2,936,681 | 3/1960 | Earp. | |
| 3,350,836 | 11/1967 | Dillion | 53—242 XR |
| 1,623,393 | 4/1927 | Dicely | 53—242 XR |
| 2,739,430 | 3/1956 | Griswold et al. | 53—48 XR |
| 3,083,510 | 4/1963 | Ganz | 53—48 |
| 2,109,505 | 3/1938 | Rue et al. | 53—49 |

THERON E. CONDON, Primary Examiner

H. M. CULVER, Assistant Examiner

U.S. Cl. X.R.

53—242